United States Patent
Martin et al.

(10) Patent No.: US 8,971,193 B2
(45) Date of Patent: Mar. 3, 2015

(54) METHOD TO DETERMINE MEDIA PATHS IN A SIP NETWORK USING INFORMATION FROM ENDPOINTS AND INTERMEDIATE DEVICES

(75) Inventors: David Samuel Martin, Pleasanton, CA (US); David Bauch, Elizabeth, CO (US); Karin Strametz, Campbell, CA (US)

(73) Assignee: Edgewater Networks, Inc., Santa Clara, CA (US)

( * ) Notice: Subject to any disclaimer, the term of this patent is extended or adjusted under 35 U.S.C. 154(b) by 490 days.

(21) Appl. No.: 13/317,673

(22) Filed: Oct. 24, 2011

(65) Prior Publication Data

US 2013/0100859 A1   Apr. 25, 2013

(51) Int. Cl.
| | |
|---|---|
| *H04J 3/14* | (2006.01) |
| *H04M 15/00* | (2006.01) |
| *H04L 12/26* | (2006.01) |
| *H04L 12/14* | (2006.01) |

(52) U.S. Cl.
CPC ............... *H04M 15/48* (2013.01); *H04L 43/04* (2013.01); *H04L 43/106* (2013.01); *H04L 12/1482* (2013.01); *H04M 15/56* (2013.01); *H04M 15/63* (2013.01)
USPC ............................ 370/241; 370/248; 370/252

(58) Field of Classification Search
USPC .................. 370/251, 259, 353, 354
See application file for complete search history.

(56) References Cited

U.S. PATENT DOCUMENTS

| | | | | |
|---|---|---|---|---|
| 6,141,686 | A  * | 10/2000 | Jackowski et al. | 709/224 |
| 7,496,044 | B1 | 2/2009 | Wing | |
| 7,519,006 | B1 * | 4/2009 | Wing | 370/252 |
| 7,688,809 | B2 * | 3/2010 | Dendukuri et al. | 370/352 |
| 7,936,694 | B2 * | 5/2011 | Choudhury | 370/252 |
| 7,936,695 | B2 * | 5/2011 | Oran | 370/252 |
| 7,944,840 | B2 * | 5/2011 | Martin et al. | 370/252 |
| 8,228,363 | B2 * | 7/2012 | Halavy | 348/14.09 |
| 8,259,723 | B2 * | 9/2012 | Lee et al. | 370/392 |
| 8,437,266 | B2 * | 5/2013 | Steiner | 370/252 |
| 8,599,704 | B2 * | 12/2013 | Wang et al. | 370/251 |
| 2007/0274284 | A1 * | 11/2007 | Dendukuri et al. | 370/351 |
| 2010/0255831 | A1 * | 10/2010 | Shuman et al. | 455/423 |
| 2012/0124606 | A1 * | 5/2012 | Tidwell et al. | 725/17 |

* cited by examiner

*Primary Examiner* — Brian O'Connor
(74) *Attorney, Agent, or Firm* — Lumen Patent Firm

(57) ABSTRACT

An internet telephony call analyzer receives call information from endpoint and intermediate network devices, corrects timestamp errors in the records, stores the records, and identifies records associated with a single call session between two endpoint devices in the network. The timestamp errors may be corrected by applying a time differential correction to a call start timestamp and call stop timestamp of the record if the timestamp in the record differs from a system timestamp when the record was received by the call analyzer. Call information records associated with the same call session may be matched by identifying records with the same SIP call ID, the same SSRC ID and call start timestamps within a predetermined time interval of each other.

4 Claims, 1 Drawing Sheet

METHOD TO DETERMINE MEDIA PATHS IN A SIP NETWORK USING INFORMATION FROM ENDPOINTS AND INTERMEDIATE DEVICES

FIELD OF THE INVENTION

The present invention relates generally to the field of internet telephony and related network technologies. More specifically, it relates to improved video- and/or voice-over-internet-protocol (VoIP) techniques.

BACKGROUND OF THE INVENTION

Session initiation protocol (SIP) is a widely deployed application-layer control protocol for initiating, modifying, or terminating VoIP call sessions. The transmission of the voice and/or video stream itself uses another application-layer protocol, the real-time transport protocol (RTP). The RTP header contains information such as the synchronization source (SSRC) identifier which identifies the source of the stream. The SIP packet body contains, among other things, session description protocol (SDP) information such as the port numbers and codecs used for the RTP media stream. An SIP user agent is a network endpoint device that can create or receive SIP messages. An SIP user agent is typically identified by a globally unique uniform resource identifier (URI) of the form sip:username:password@host:port. SIP also has a globally unique Call-ID header value which identifies SIP messages belonging to the same dialog or registration. The Call-ID, however, is often changed as SIP packets traverse intermediate devices between endpoints, so it is not a globally constant identifier. Moreover, SIP does not use a globally unique and constant session identifier for a particular call, where a "call" is defined as a particular RTP media stream that flows during a session between two endpoint devices. As a result, it is often difficult to identify the endpoints and network path used for any given SIP call in a VoIP network.

For example, an RTP media stream that is transported between endpoints of a VoIP network typically passes through many different intermediate devices and IP networks. In order to troubleshoot network impairments that negatively affect call quality, network operators must manually identify all of the elements processing media as well as determine the path or "hops" through the network that the media is using. This can be a very time consuming process as network operators must manually match statistics from different network elements using a combination of call timestamps, phone numbers called and call duration.

SUMMARY OF THE INVENTION

In one aspect, the present invention provides a method to determine the endpoints, intermediate devices, and network path for any given SIP call using call timestamps, the SIP Call-ID value in the SIP header, and the SSRC identifier in the RTP or media packet header. The method identifies all of the endpoints and intermediate devices that are involved in the processing and support of a voice or video call by using SIP and RTP information supplied by the devices. Specifically, call statistics for SIP-based voice and video calls are calculated and reported to a central call analyzer by many elements in a VoIP network including endpoint devices (e.g., IP phones, PSTN gateways, soft-clients) as well as intermediate devices (e.g., Enterprise Session Border Controllers, Session Border Controllers, VoIP test probes/monitors). The call analyzer combines the reported information to identify the devices associated with each call and also determines the network path of the media flow for each call, including the network "hops" or individual segments between endpoints.

The techniques of this invention result in various benefits such as substantially reduced problem resolution times through the automatic and programmatic approach of accurately determining the elements and media call path for any given SIP-based voice or video session.

Two key distinguishing features are as follows:

The technique provides the ability to determine all of the elements reporting statistics for any given session using the combination of information in a SIP header, timestamps and the SSRC field of RTP packets.

The technique identifies and corrects for time differences between call quality statistics sent from an endpoint or intermediate device to a central collection agent, so that all of the elements along a call or session path can be identified. Such normalization reduces the potential for false positive matches given the limited range of valid values for the SSRC field (32 bit field).

In one aspect, the invention provides a method for analyzing interne telephony calls including receiving by a call analyzer via internet protocol multiple call information records from multiple endpoint and intermediate devices in a network; correcting by the call analyzer timestamp errors in the received multiple call information records; storing by the call analyzer the received call information records; and identifying by the call analyzer a set of matching call information records from among the multiple call information records, where the set of matching call information records are associated with a single call session between two endpoint devices in the network.

The timestamp errors in the received multiple call information records may be corrected by comparing a timestamp in a record of the multiple call information records with a system timestamp of the call analyzer when the record was received by the call analyzer, and, if the timestamp in the record differs from the system timestamp, applying a time differential correction to a call start timestamp and call stop timestamp of the record.

Each of the call information records may include a call timestamp, an SIP Call-ID value from an SIP header, and an SSRC identifier from an RTP packet header. Identifying the set of matching call information records preferably uses SIP call ID information, SSRC ID information, and timestamp information in the multiple call information records to identify matching records associated with the single call session. More specifically, identifying the set of matching call information records may be performed by identifying records with a same SIP call ID, a same SSRC ID and call start timestamps within a predetermined time interval (e.g., 300 seconds) of each other.

DETAILED DESCRIPTION

Figure 1:
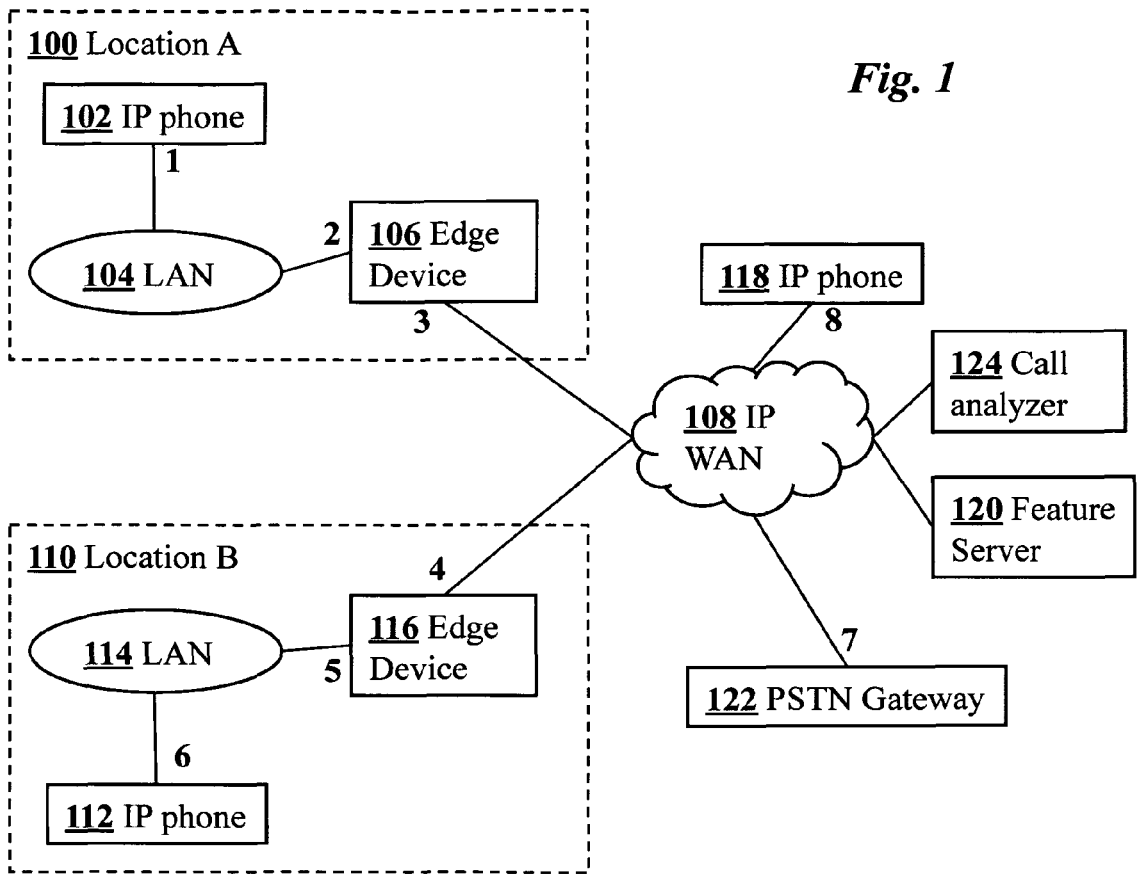
FIG. 1 is a schematic block diagram illustrating a VoIP network implementing a preferred embodiment of the invention.

FIG. 1 is a schematic block diagram illustrating a VoIP network implementing a preferred embodiment of the invention. The network includes a location A 100 connected to a location B 110 through an IP WAN 108. Location A 100 includes an IP phone 102, LAN 104, and edge device 106. Similarly, location B 110 includes an IP phone 112, LAN 114, and edge device 116. The edge devices 106 and 116 connect the other devices at their respective locations to the WAN 108. Also shown in the figure are IP phone 118, feature server 120, PSTN gateway 122, and Call analysis device 124, each connected to the WAN 108.

Various devices in the network always monitor call information at their network interfaces and send this information at call completion to a central location for analysis. Call information could include the following:

Start time,
End time,
Source IP,
Source telephone number,
Destination IP,
Destination telephone number,
The number of times the MOS fell below the defined threshold,
Quality degradation due to jitter,
Quality degradation due to packet loss,
Packets lost,
Packets received,
Packets expected,
Out of sequence packets,
Mean positive deviation.
Max positive deviation.
Minimum negative jitter,
Consecutive packet loss,
Average consecutive packet loss,
The average listening R-factor for the burst periods,
The average listening R-factor for the gap periods,
Total length in milliseconds of lost speech in a burst state not handled effectively by Packet Loss Concealment,
Total length in milliseconds of lost speech in a gap state not handled effectively by Packet Loss Concealment,
Quality degradation attributed to delay,
Quality degradation attributed to low speech energy level,
Quality degradation attributed to high noise level,
Quality degradation attributed to high echo level,
Quality degradation attributed to recent losses or discards,
Packets received with errors but corrected by error correction algorithms,
Packets discarded by the endpoint due to late arrival,
Packets arriving as duplicates of previously received packets,
Number of transport packet loss/discard burst occurrences,
Number of transport packet loss/discard gap occurrences,
Conversation Mean Opinion Score,
Listening Mean Opinion Score,
Destination IP address for the outbound WAN RTP flow,
Destination port for the outbound WAN RTP flow,
Source IP address for the inbound WAN RTP flow,
Source port for the inbound WAN RTP flow,
SIP call identifier,
Codec utilized to encode the audio,
Round trip time,
Timestamp for the receipt of the INVITE message,
Timestamp for the receipt of the RING message,
Timestamp for the receipt of the BYE message,
The interface on which the RTP flow is received,
If the call utilizes an FXS port, the total number of silence packets,
If the call utilizes an FXS port, the total number of late packets,
If the call utilizes an FXS port, the total number of early packets,
If the call utilizes an FXS port, whether the T38 (fax) protocol was utilized,
If the call utilizes an FXS port, the play out delay,
If the call utilizes an FXS port, the current buffer,
If the call utilizes an FXS port, the jitter type—fixed or adaptive,
If the call utilizes an FXS port, whether voice activity detection was utilized,
If the call utilizes an FXS port, the fax baud rate,
If the call utilizes an FXS port, the fax port utilized,
If the call utilizes an FXS port, the CAS channel,
If the call utilizes an FXS port, the CAS source number,
If the call utilizes an FXS port, the PRI channel,
If the call utilizes an FXS port, the PRI source number,
Source SSRC,
Destination SSRC, and
fields defined by RFC 6035.

More specifically, the IP phones 102, 112, 118 monitor call information at call quality monitor points 1, 6, 8, respectively. Similarly, edge device 106 monitors call information at call quality monitor points 2 and 3; edge device 116 monitors call information at call quality monitor points 4 and 5; and PSTN gateway 122 monitors call information at call quality monitor point 7. Each of these devices reports via syslog messaging or the SIP publish the call information to call analysis device 124.

Figure 2:
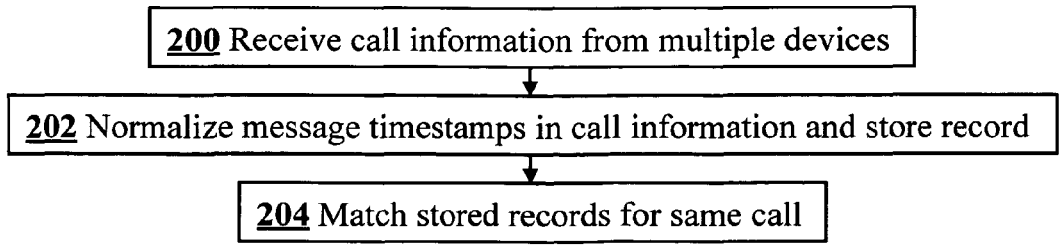
FIG. 2 is a flowchart according to an embodiment of the invention outlining how call analyzer processes call information records from multiple network devices and matches records associated with the same call session.

As outlined in the flowchart of FIG. 2, call analyzer 124 receives the call information from the various devices and then processes it. In step 200 the call information is received by the call analysis device 124 from the various network devices including VoIP endpoint devices 102, 112, 118, 122 and the edge devices 106, 116. In step 202 the call analysis device normalizes the timestamps in the call information to account and correct for any differences between the system time settings of the reporting devices. This normalization is done by comparing the current system time of the call analysis device with the message timestamps of messages received from the devices. Once the difference is computed, the call analyzer will apply this difference to all call timestamps for the records from the reporting devices prior to storing the information.

For example, if a message was received from the edge device at location A with a current timestamp of 10:06 AM and the current call analyzer system time was 10:06 AM when the message was processed by call analyzer, the differential would be zero. Accordingly, the timestamps within the message would not be adjusted. If a message was received from the edge device at location B for the same call and the message has a timestamp of 2:06 PM due to an incorrect system time and the current call analyzer system time was 10:06 AM when the message was processed, the differential would be 4 hours. Accordingly, the timestamps within the message would be adjusted by 4 hours. This applies to both the start and stop timestamps for the call. Without modification of the start and stop timestamps in the message from the edge device at location B the records from each edge device would not be associated or matched. In this example, the timestamps for the call records from edge device at location B would be modified by subtracting 4 hours from the timestamps before storing the information in call analyzer.

In step 204, the call analyzer selects a record as the base record based on user input and attempts to find a match for other records belonging to the same call from among other call information records received by the call analyzer. Considering a call between location A and location B as an example, two records are sent at call completion from each edge device (one from the LAN interface and another from the WAN interface) monitored at points 2, 3, 4, 5. In addition, records are sent at call completion from the IP Phones monitored at points 1 and 6. To support the sending of reports, the IP Phones must implement the functionality described in RFC 6035. If some phones have this functionality and some do not, then you will have more information than if no phones had the functionality and less information than if all phones had the functionality. Implementation of the functionality by phones is a recent phenomenon. The implementation of the reporting functionality of edge devices (EdgeMarcs) targeted this lack of functionality.

To increase the reliability of the solution, SSRC IDs are preferably duplicated for both interfaces by the edge device. In particular, the edge device will copy the SSRC ID from the LAN interface transmit stream to the SSRC ID reported for the WAN transmit stream prior to sending the records to the call analyzer. The edge device will also copy the SSRC ID from the LAN interface receive to the SSRC ID reported for the WAN receive stream prior to sending the records to Call analyzer. Due to this duplication, if one of the interface records is lost, the call analyzer will still be able to determine the SSRC ID of the interface using the value in the received duplicate record. The IP phones at locations A and B will also send their SIP call ID and SSRC IDs to the call analyzer using RTP control protocol extended reports (RTCP-XR).

This matching method uses both the SIP call ID and SSRC IDs reported to determine that the edge device LAN and WAN records as well as reports from IP Phones are for the same SIP call. The SIP call ID is used in combination with the SSRC ID to establish the match because some endpoints will use the same SSRC IDs for different calls. All records with the same SIP call ID, call start time and SSRC IDs are considered to match and thus belong to the same SIP call.

In the example shown in FIG. 1, there are three records sent from location A to the call analyzer 124 for an SIP call between IP phone 102 and IP phone 112: two records are sent from the edge device (one for the LAN interface and one for the WAN interface) and one record is sent from the IP phone 102. The call analyzer identifies these records as being from the same call by matching the SIP call IDs with a search of normalized records within a 300 second range of time.

Other time ranges would work. The minimum time range is constrained by the deviation in the reporting delay from edge device A to the call analyzer versus the reporting delay from edge device B to the call analyzer. A range of only 5 seconds would be reasonable, but would raise the possibility that records would not be found. There is no constraint on the maximum time range. The time range is utilized, however, to 1) reduce the possibility of false matches and 2) reduce the processing needed to process the selection. While the database containing the call records may contain millions of call records, only a few hundred are within the time range. Thus, applying this selection criteria limits the number of records to which the additional selection criteria is applied.

The SIP call ID is common between all of these three records. Once all of the location A records are matched, the call analyzer will use the SSRC IDs of these matching records to identify other records that are used for the same call, thereby identifying other devices in the network path of the call. It identifies these records by matching SSRC IDs for transmit and receive streams. The SSRC IDs will be reversed in these instances. That is, the value of the SSRC ID for the IP phone 102 transmit stream (at point 1) will be equal to the SSRC ID LAN (at point 2) and WAN (at point 3) receive stream. The value of the SSRC ID for the IP phone (at point 1) receive stream will be equal to the SSRC ID LAN (at point 2) and WAN (at point 3) transmit stream.

Once the SSRC IDs are determined for the SIP call at location A, the call analyzer will search all other call records received from other devices in the network over the same 300 second time range to find other records from the same call. A record is considered to be a part of the same call if the SSRC ID for the WAN receive stream matches the SSRC ID for the LAN or IP phone transmit stream with the similar (i.e., within 300 seconds, after normalization) start timestamps. A record is also considered to be a part of the same call if the SSRC ID for the LAN receive stream matches the SSRC ID for the WAN receive stream with the similar (i.e., within 300 seconds, after normalization) start timestamp. This latter search case covers the scenario where a call was made from an IP phone at location A to an analog phone attached to an FXS port integrated with the edge device, or other reporting device, at location B.

Using this technique call records between points 1, 8, 6 and 7 in any combination can be matched, thereby identifying calls not only to and from IP phones within LANs, but also IP phone 8 in the WAN and phones behind PSTN gateway 122.

The feature server 120 routes and completes the call. The IP phone only knows to initiate a call by sending a SIP packet to the feature server. The feature server knows how to route the call. The feature server also has upstream connectivity to the PSTN. The involvement of the feature server also presents the issue for which the invention provides a solution. More specifically, the call consists of two legs—a leg between the initiating phone to the feature server and a leg between the feature server and the destination phone. The feature server utilizes a different SIP call identifier for the second leg than the initiating phone utilizes for the first leg. This precludes the utilization of the SIP call identifier alone to associate the various call records.

The call analyzer 124 can include a database, graphical user interface and application logic. It can be delivered in an appliance form factor or as a software package that is installed on off-the-shelf servers, workstations or blades. Key features of the call analyzer include the following:

Determining the media path of SIP VoIP and Video calls using the method described in embodiments of this invention, MOS (mean opinion score) statistics capture—continuous and historical, Proactive notification of poor call quality using SNMP traps or email, Call signaling capture and analysis for advanced troubleshooting, Active line VoIP testing, Automated Plug & Dial setup of IP phones and other devices, Advanced knowledgebase, Configuration/setup of CPE including EdgeMarc, EdgeConnect, and IP phones, Image management and group upgrades for multiple nodes, Secure transfer of User Agent authentication credentials, Works with existing NMS infrastructure, High availability, Tiered administration privileges and multiple user accounts, and Multi-tenant capability.

The matched records are utilized as a report or display to the network operator. These records are already stored in the call analyzer's database. Matching the records allows all of the call information or statistics known about the call to be displayed and/or grouped together in a single view. In turn, this enables manual or automated analysis that would suggest the source and/or location of a condition that resulted in call quality degradation.

The invention claimed is:

1. A method for determining a network path for an internet telephony call, the method comprising:

receiving by a call analyzer via internet protocol multiple call information records from multiple endpoint and intermediate devices in a network; wherein each of the call information records comprises a call timestamp, an SIP Call-ID value from an SIP header, and an SSRC identifier from an RTP packet header correcting by the call analyzer timestamp errors in the received multiple call information records;

storing by the call analyzer the received call information records;

identifying by the call analyzer a set of matching call information records from among the multiple call information records using corrected timestamp information in the multiple call information records, wherein the set of matching call information records are associated with a single call session between two endpoint devices in the network, whereby the network path for the single call is determined.

2. The method of claim 1 wherein correcting timestamp errors in the received multiple call information records comprises comparing a timestamp in a record of the multiple call information records with a system timestamp of the call analyzer when the record was received by the call analyzer, and, if the timestamp in the record differs from the system timestamp, applying a time differential correction to a call start timestamp and call stop timestamp of the record.

3. The method of claim 1 wherein identifying the set of matching call information records comprises using SIP call ID information in the multiple call information records, SSRC ID information in the multiple call information records, and timestamp information in the multiple call information records to identify matching records associated with the single call session.

4. The method of claim 1 wherein identifying the set of matching call information records comprises identifying records with a same SIP call ID, a same SSRC ID and call start timestamps within 300 seconds of each other.

* * * * *